Patented Nov. 21, 1939

2,180,666

UNITED STATES PATENT OFFICE 2,180,666

ANTIOXIDANT

Albert M. Clifford, Stow, Ohio, assignor to Wingfoot Corporation, Wilmington, Del., a corporation of Delaware No Drawing. Application September 29, 1934, Serial No. 746,268

15 Claims. (Cl. 18—50)

This invention relates to the treatment of rubber and the like for the purpose of improving the age resisting qualities of the same and, more particularly, to new and improved age resisters or antioxidants suitable to be used with rubber to increase the lasting qualities thereof.

The new age resisters or antioxidants comprise the reaction products of aliphatic alcohols and primary aromatic amines, a catalyst ordinarily being used to promote the reaction. The reaction mass resulting from the interaction of a given alcohol and a given amine may be used as such, without separation of the ingredients, as an antioxidant by direct incorporation in a rubber mix, by applying the same to the surface of the rubber, or in any other suitable manner. Reaction products of two or more alcohols on a given amine or of two or more amines on a given alcohol, or of a plurality of alcohols on a plurality of amines, may also be used.

The reaction mass is complex in nature and contains a number of different compounds, some or all of these apparently accounting for the utility of the reaction product. Thus, in the simpler cases, there will be found in the mass compounds of the type

Depending on the conditions employed for effecting the reaction, other products may also be formed, namely:

and still other compounds of the tertiary amine type. The reactions are also accompanied by the formation of high boiling nitrogen containing compounds of unknown nature.

Among the alcohols which may thus be reacted with amines to give the products and compounds of the invention may be mentioned the following: methyl and ethyl alcohols, normal propyl and iso propyl alcohols, normal butyl, iso butyl, secondary butyl and tertiary butyl alcohols, amyl and iso amyl alcohols, cyclohexanol and methyl cyclohexanol, hexyl, heptyl, octyl, nonyl, decyl, hexadecyl, octadecyl alcohols, and others.

Any one or more of these alcohols, and similar alcohols, may be reacted with one or more of the following amines: aniline, toluidine, xylidine, cumidine, alpha naphthylamine, beta naphthylamine, alpha methyl beta naphthylamine, amino diphenyl amine, p p' diamino diphenyl methane, p p' diamino ditolyl methane, p-amino benzyl aniline, diamino diphenyl disulphide, amino biphenyl, amino acenaphthene, 2-4-diamino phenyl naphthyl ether, and other primary aromatic amines.

The reaction leading to the formation of the desired products is ordinarily carried on in an autoclave, the selected proportions of alcohol and amine being heated in the presence of a catalyst, such as zinc chloride, aluminum chloride or tin tetra chloride, for 7 to 15 hours at 275–300° C. Maintenance of these conditions is productive of desirable reaction products. Molar proportions of alcohol and amine give good results but these proportions may be varied within limits and still give a satisfactory product.

As specific illustrations of the manner in which the antioxidant mixtures are obtained, the following are given:

*Example 1*

3 mols each of methanol, aniline and zinc chloride are autoclaved for 7½ hours at a temperature of 280–290° C. The black tarry reaction mass is then treated with NaOH and the resulting oil separated and subjected to distillation under reduced pressure. The portion of the product having a boiling point between 204–220° C. under 45 mm. pressure, the same being an oil at room temperature, is used as an antioxidant.

*Example 2*

3 mols each of aniline, normal butyl alcohol and zinc chloride are heated for 7½ hours in an autoclave in the same manner as in the foregoing example. The oil liberated from the reaction mass by treatment with 20% NaOH is fractionated under reduced pressure and the higher boiling fraction, having a boiling point between 130–170° C. at 5 mm. pressure, is used in rubber. It is a pale straw-colored oil.

*Example 3*

A mixture of 286 parts of alpha naphthylamine, 300 parts of isopropyl alcohol and 5.9 parts of SnCl₄ are heated for 9½ hours at 290° C. The reaction product is distilled and the fraction having a boiling point range of 190–245° C. at 55 mm.

pressure and amounting to 205 parts was used as an antioxidant.

The reaction products thus obtained were tested in rubber by incorporation in a stock having the following composition:

| | Parts |
|---|---|
| Extracted rubber | 100 |
| Zinc oxide | 5 |
| Sulphur | 3 |
| Stearic acid | 1.5 |
| Hexamethylene tetramine | 1.0 |
| Antioxidant | 1.0 |

A low temperature ageing test employing the above mentioned stock gave the following results:

| Cure | Original | | | | Aged | | | | Percent wt. inc. |
|---|---|---|---|---|---|---|---|---|---|
| | Tens. | Elong. | 500% | 700% | Tens. | Elong. | 500% | 700% | |

METHYL ALCOHOL+ANILINE

| | | | | | | | | | |
|---|---|---|---|---|---|---|---|---|---|
| 35/285 | 108 | 895 | 12 | 37 | 97 | 840 | 13 | 44 | .12 |
| 50 | 132 | 825 | 16 | 59 | 100 | 775 | 17 | 64 | .30 |
| 70 | 143 | 775 | 21 | 86 | 117 | 740 | 23 | 87 | .52 |

BUTYL ALCOHOL+ANILINE

| | | | | | | | | | |
|---|---|---|---|---|---|---|---|---|---|
| 35/285 | 126 | 815 | 16 | 62 | 118 | 790 | 18 | 68 | .20 |
| 50 | 172 | 775 | 25 | 112 | 146 | 735 | 27 | 116 | .40 |
| 70 | 186 | 715 | 27 | 170 | 150 | 695 | 38 | | .75 |

ISOPROPYL ALCOHOL+ALPHA NAPHTHYLAMINE

| | | | | | | | | | |
|---|---|---|---|---|---|---|---|---|---|
| 35/285 | 138 | 900 | 13 | 35 | 112 | 850 | 15 | 47 | .01 |
| 50 | 122 | 825 | 17 | 58 | 132 | 790 | 20 | 77 | .10 |
| 70 | 150 | 790 | 23 | 87 | 155 | 760 | 27 | 108 | .09 |

It will be observed that the physical properties of the rubber after ageing for six days in the presence of oxygen under 150 pounds pressure compare very favorably with the same properties of the unaged rubber and that, furthermore, the increase in weight of the aged samples was small, thus indicating a slow rate of absorption of oxygen.

The age resisters were further tested by applying a high temperature ageing test in a stock made up as follows:

| | Parts |
|---|---|
| Smoked sheet | 100 |
| Zinc oxide | 92.5 |
| Carbon black | .6 |
| $Fe_2O_3$ | .7 |
| Sulphur | 3.5 |
| Diphenylguanidine | .7 |
| Antioxidant | 5.0 |

Cured strips of the foregoing composition, but varying in the particular antioxidant used, were aged in an air bomb at 114° C. for 7 hours at 80 pounds pressure per square inch. The following data was obtained:

| Cure | Orignal | | | | Aged | | | |
|---|---|---|---|---|---|---|---|---|
| | Tens. | Elong. | 300% | 500% | Tens. | Elong. | 300% | 500% |

METHYL ALCOHOL+ANILINE

| | | | | | | | | |
|---|---|---|---|---|---|---|---|---|
| 35/285 | 224 | 680 | 29 | 92 | 98 | 610 | 23 | 61 |
| 50 | 224 | 670 | 32 | 99 | 116 | 625 | 28 | 70 |
| 70 | 236 | 650 | 38 | 116 | 111 | 575 | 32 | 80 |

BUTYL ALCOHOL+ANILINE

| | | | | | | | | |
|---|---|---|---|---|---|---|---|---|
| 35/285 | 190 | 700 | 22 | 70 | 62 | 625 | 15 | 36 |
| 50 | 205 | 680 | 26 | 82 | 84 | 650 | 18 | 43 |
| 70 | 212 | 640 | 32 | 100 | 82 | 575 | 25 | 59 |

ISOPROPYL ALCOHOL+ALPHA NAPHTHYLAMINE

| | | | | | | | | |
|---|---|---|---|---|---|---|---|---|
| 35/285 | 202 | 680 | 30 | 89 | 89 | 650 | 20 | 48 |
| 50 | 218 | 650 | 38 | 110 | 90 | 580 | 30 | 67 |
| 70 | 238 | 640 | 43 | 123 | 96 | 540 | 38 | 83 |

Here, again, the physical properties of the aged strips compare very favorably with the properties of the specimens before ageing.

It is apparent, then, that the composite products herein disclosed and described are valuable as age resisters in rubber, counteracting, as they do, the effects of heat, light and oxygen and also imparting other desirable qualities such as increased resistance to deterioration resulting from flexing. The composite products generally possess a lower melting point than the separate components thereof to which may be attributed the antioxidant effect of the mass, and the composite product therefore disperses more readily in rubber during processing. It has also been found that these complex reaction products show less tendency to bloom than do individual compounds when used in rubber, the reason for this being, perhaps, that crystals are less likely to form from such mixtures.

The term "rubber", as used, includes rubber, synthetic rubber, latex, guayule, gutta percha, balata, rubber isomers and rubber conversion products and similar materials.

While preferred embodiments of the invention have been set forth in the foregoing description, the invention is not limited thereto but only by the appended claims which are intended to include all features of patentable novelty residing in the invention.

What I claim is:

1. The process of preserving rubber which comprises treating the same with a composite product obtained by causing a primary aromatic amine to react with a saturated monohydric aliphatic hydrocarbon alcohol in approximately molar proportions at a temperature between about 275° C. and 300° C. for a period of about 7 to 15 hours.

2. The process of preserving rubber which comprises incorporating therein a composite product obtained by causing to react in a closed vessel at a temperature between about 275° and 300° C. for a period of about 7 to 15 hours a primary aromatic amine with a saturated aliphatic hydrocarbon alcohol in approximately molar proportions.

3. The process of preserving rubber which comprises incorporating therein a composite product obtained by causing to react in a closed vessel at a temperature between about 275° and 300° C. for a period of 7 to 15 hours, approximately molecular proportions of a primary aromatic amine and a saturated aliphatic hydrocarbon alcohol in the presence of a condensation catalyst and removing the more volatile portions of the reaction mass.

4. The process of preserving rubber which comprises vulcanizing the same in the presence of a composite product obtainable by causing a primary amine of the benzene and naphthalene series to react with a saturated monohydric aliphatic hydrocarbon alcohol in approximately molar proportions at a temperature between about 275° C. and 300° C. for a period of about 7 to 15 hours.

5. The process of preserving rubber which comprises vulcanizing the same in the presence of a composite product obtainable by causing to react in approximately molecular portions a primary amine of the benzene and naphthalene series and a saturated monohydric aliphatic hydrocarbon alcohol having at least two carbon atoms, at a temperature between about 275° C. and 300° C. for a period of about 7 to 15 hours.

6. The process of preserving rubber which comprises vulcanizing the same in the presence of a composite product obtained by causing to react in approximately molecular proportions a primary amine of the benzene and naphthalene series and a straight chain saturated monohydric hydrocarbon alcohol at a temperature between about 275° C. and 300° C. for a period of about 7 to 15 hours.

7. The process of preserving rubber which comprises vulcanizing the same in the presence of a composite product obtainable by causing a primary aromatic amine to react with a butyl alcohol in approximately molar proportions at a temperature between about 275° C. and 300° C. for a period of about 7 to 15 hours.

8. The process of preserving rubber which comprises vulcanizing the same in the presence of a composite product obtainable by reacting aniline and normal butyl alcohol in approximately molar proportions at a temperature between 275° and 300° C. for a period of 7 to 15 hours.

9. The process of preserving rubber which comprises incorporating therein a composite product obtained by causing a primary aromatic amine to react with a saturated monohydric aliphatic hydrocarbon alcohol in the proportion of not more than one mol of amine to one mol of alcohol, at a temperature between about 275° C. and 300° C. for a period of about 7 to 15 hours.

10. The process of preserving rubber which comprises incorporating therein a composite product obtained by causing at least one primary aromatic amine to react with at least one saturated monohydric aliphatic hydrocarbon alcohol in approximately molecular proportions, at a temperature between about 275° C. and 300° C. for a period of about 7 to 15 hours.

11. An age-resisting rubber composition comprising rubber and a composite product obtained by causing a primary aromatic amine to react with a saturated monohydric aliphatic hydrocarbon alcohol in approximately molecular proportions, at a temperature between about 275° C. and 300° C. for a period of about 7 to 15 hours.

12. The process of preserving rubber which comprises treating the same with a composite product obtained by causing approximately molecular proportions of a primary aromatic amine and a saturated monohydric aliphatic hydrocarbon alcohol to react at a temperature between about 275° and 300° C. for a period of about 7–15 hours in the presence of a catalyst.

13. The process of preserving rubber which comprises treating the same with a composite product obtained by causing a primary amine of the benzene and naphthalene series to react with a branched chain saturated monohydric aliphatic hydrocarbon alcohol in approximately molar proportions at a temperature between about 275° and 300° C. for a period of about 7–15 hours.

14. The process of preserving rubber which comprises treating the same with a composite product obtained by causing a primary aromatic amine to react with a propyl alcohol in approximately molar proportions at a temperature between about 275° and 300° C. for a period of about 7–15 hours.

15. The process of preserving rubber which comprises treating the same with a composite product obtained by causing aniline to react with isopropyl alcohol in approximately molar proportions at a temperature between about 275° and 300° C. for a period of about 7–15 hours.

ALBERT M. CLIFFORD.